United States Patent
Hillis et al.

(10) Patent No.: US 7,130,489 B2
(45) Date of Patent: Oct. 31, 2006

(54) CHROMATIC ABERRATION CORRECTION BY MOVING PHOTO-DETECTOR ARRAY

(75) Inventors: W. Daniel Hillis, Encino, CA (US); Nathan P. Myhrvold, Medina, WA (US); Clarence T. Tegreene, Bellevue, WA (US); Lowell L. Wood, Jr., Livermore, CA (US)

(73) Assignee: Searete LLC, Bellevue, WA (US)

( * ) Notice: Subject to any disclaimer, the term of this patent is extended or adjusted under 35 U.S.C. 154(b) by 410 days.

(21) Appl. No.: 10/788,038

(22) Filed: Feb. 25, 2004

(65) Prior Publication Data

US 2005/0185857 A1    Aug. 25, 2005

(51) Int. Cl.
*G06K 9/36* (2006.01)
*G06K 9/00* (2006.01)
*G02B 13/10* (2006.01)
*G01J 3/44* (2006.01)

(52) U.S. Cl. .................. 382/284; 382/167; 359/433; 356/301

(58) Field of Classification Search ............... 382/284, 382/167
See application file for complete search history.

(56) References Cited

U.S. PATENT DOCUMENTS

| | | | | | |
|---|---|---|---|---|---|
| 4,215,273 | A | * | 7/1980 | Frosch et al. ............... | 250/347 |
| 4,746,798 | A | * | 5/1988 | Amon et al. ............ | 250/339.02 |
| 4,786,964 | A | * | 11/1988 | Plummer et al. ........... | 348/270 |
| 5,644,396 | A | * | 7/1997 | Hopkins, II ............... | 356/301 |
| 5,877,807 | A | * | 3/1999 | Lenz ....................... | 348/218.1 |
| 5,930,405 | A | * | 7/1999 | Chida ......................... | 382/284 |
| 6,046,772 | A | * | 4/2000 | Howell ....................... | 348/273 |
| 6,069,651 | A | * | 5/2000 | Tsuyuki et al. ............... | 348/75 |
| 6,525,828 | B1 | * | 2/2003 | Grosskopf ................... | 356/613 |
| 6,552,788 | B1 | * | 4/2003 | Castle ......................... | 356/326 |

* cited by examiner

*Primary Examiner*—Bhavesh M. Mehta
*Assistant Examiner*—Utpal Shah

(57) ABSTRACT

A system constructs a composite image by moving a photo-detector array.

45 Claims, 6 Drawing Sheets

US 7,130,489 B2

CHROMATIC ABERRATION CORRECTION BY MOVING PHOTO-DETECTOR ARRAY

TECHNICAL FIELD

The present application relates, in general, to imaging.

SUMMARY

In one aspect, a method includes but is not limited to: capturing a representation of a first image from a photo-detector array at a first orientation; changing an orientation of the photo-detector array about a defined axis in response to a defined wavelength; capturing a representation of another image from the photo-detector array at another orientation; and generating a composite image utilizing the representation of the first image and the representation of the other image. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a system includes but is not limited to: a photo-detector array; a controller configured to change a position of said photo-detector array from a first orientation to another orientation in response to a defined wavelength; an image capture unit operably coupled with said controller; and an image construction unit operably coupled with said image capture unit, said image construction unit configured to construct utilizing the representation of the first image and the representation of the other image. In addition to the foregoing, other system aspects are described in the claims, drawings, and text forming a part of the present application.

In one aspect, a method includes but is not limited to: capturing a representation of a first image from a photo-detector array at a first orientation; tilting the photo-detector array about a defined axis of tilt in response to a defined wavelength; capturing a representation of another image from the photo-detector array at another orientation; and generating a composite image utilizing the representation of the first image and the representation of the other image. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a method includes but is not limited to: capturing a representation a representation of a first image from a photo-detector array at a first orientation; rotating the photo-detector array about a defined axis of rotation in response to a defined wavelength; capturing a representation of another image from the photo-detector array at another orientation; and generating a composite image utilizing the representation of the first image and the representation of the other image. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a method includes but is not limited to: capturing a representation a representation of a first image from a photo-detector array at a first orientation; tilting the photo-detector array about a defined axis of tilt and rotating the photo-detector array about a defined axis of rotation in response to a defined wavelength; capturing a representation of another image from the photo-detector array at another orientation; and generating a composite image utilizing the representation of the first image and the representation of the other image such that a chromatic aberration is reduced. In addition to the foregoing, other method aspects are described in the claims, drawings, and text forming a part of the present application. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined by the claims, will become apparent in the detailed description set forth herein.

BRIEF DESCRIPTION OF THE FIGURES

The use of the same symbols in different drawings typically indicates similar or identical items

DETAILED DESCRIPTION

Figure 1:
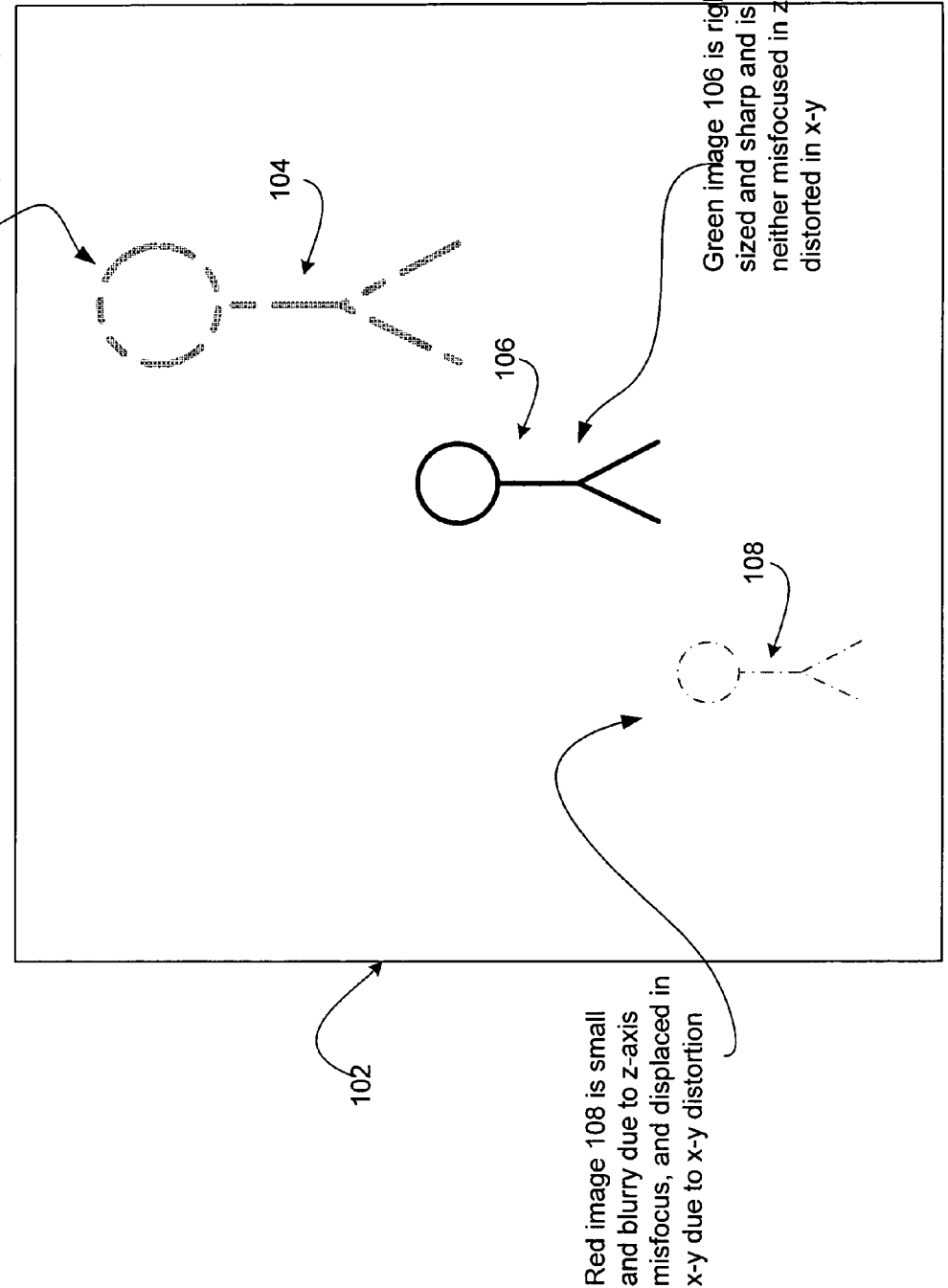
FIG. 1 shows a front-plan view of blue image 104, green image 106, and red image 108 of a person (e.g., person 202 of FIG. 2) that have been projected onto photo-detector array 102 through a lens system (e.g., lens system 200 of FIG. 2).
Figure 2:
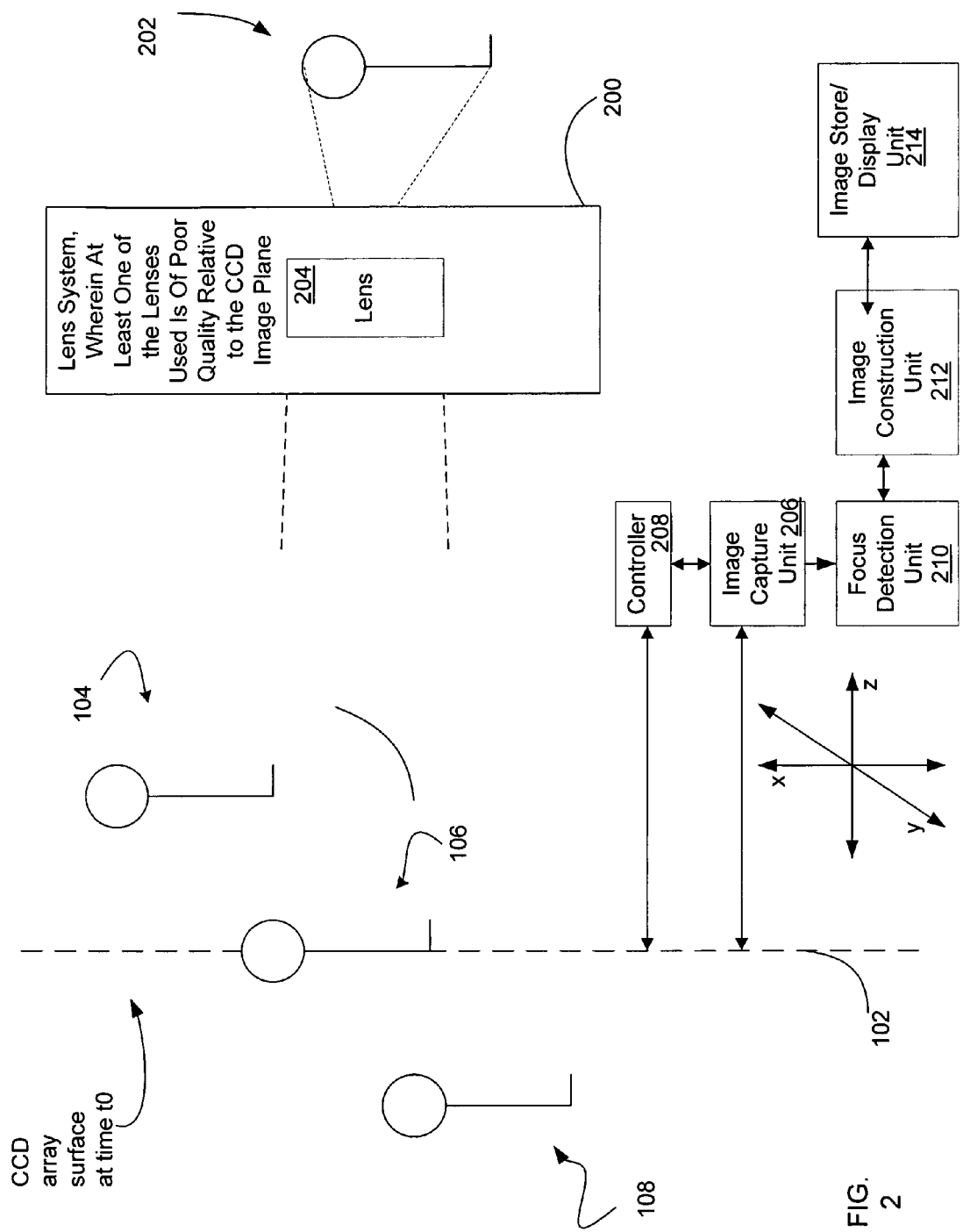
FIG. 2 depicts a side-plan view of lens system 200 that can give rise to blue image 104, green image 106, and red image 108 of person 202 (e.g., as shown and described in relation to FIG. 1).

With reference to the figures, and with reference now to FIG. 1, shown is a front-plan view of blue image 104, green image 106, and red image 108 of a person (e.g., person 202 of FIG. 2) that have been projected onto photo-detector array 102 through a lens system (e.g., lens system 200 of FIG. 2). Blue image 104 is illustrated as large and blurry, which can occur when chromatic aberration causes blue image 104 to come to a focus in front of an imaging surface of photo-detector array 102 (e.g., as shown and described in relation to FIG. 2). Green image 106 is illustrated as right sized, which can occur when green image 106 is correctly focused on an imaging surface of photo-detector array 102 (e.g., as shown and described in relation to FIG. 2). Red image 108 is shown as small and faint, which can occur when chromatic aberration causes red image 108 to come to a focus (virtual) behind an imaging surface of photo-detector array 102 (e.g., as shown and described in relation to FIG. 2). In addition, also shown is that various similar or other factors also cause blue image 104 and red image 108 to be distorted in x-y.

Referring now to FIG. 2, depicted is a side-plan view of lens system 200 that can give rise to blue image 104, green image 106, and red image 108 of person 202 (e.g., as shown and described in relation to FIG. 1). Lens 204 of lens system 200 is illustrated as located at a position giving rise to blue image 104, green image 106, and red image 108 shown and described in relation to FIG. 1. Blue image 104 is illustrated as focused in front of an imaging surface of photo-detector array 102. Green image 106 is illustrated as focused on an imaging surface of photo-detector array 102. Red image 108 is shown virtually focused behind an imaging surface of photo-detector array 102. (It is recognized that in side-plan view the head and feet of person 202 would appear as lines; however, for sake of clarity they are shown in profile in FIG. 2 to help orient the reader relative to FIG. 1.)

Continuing to refer to FIG. 2, further shown are components that can serve as an environment for one or more processes shown and described herein. Specifically, controller 208 is depicted as controlling the position of photo-detector array 102 (e.g., via use of a feedback control subsystem). Image capture unit 206 is illustrated as receiving image data from photo-detector array 102 and receiving control signals from controller 208. Image capture unit 206 is shown as transmitting captured image information to focus detection unit 210. Focus detection unit 210 is depicted as transmitting focus data to image construction unit 212. Image construction unit 212 is illustrated as transmitting a composite image to image store/display unit 214.

Figure 3:
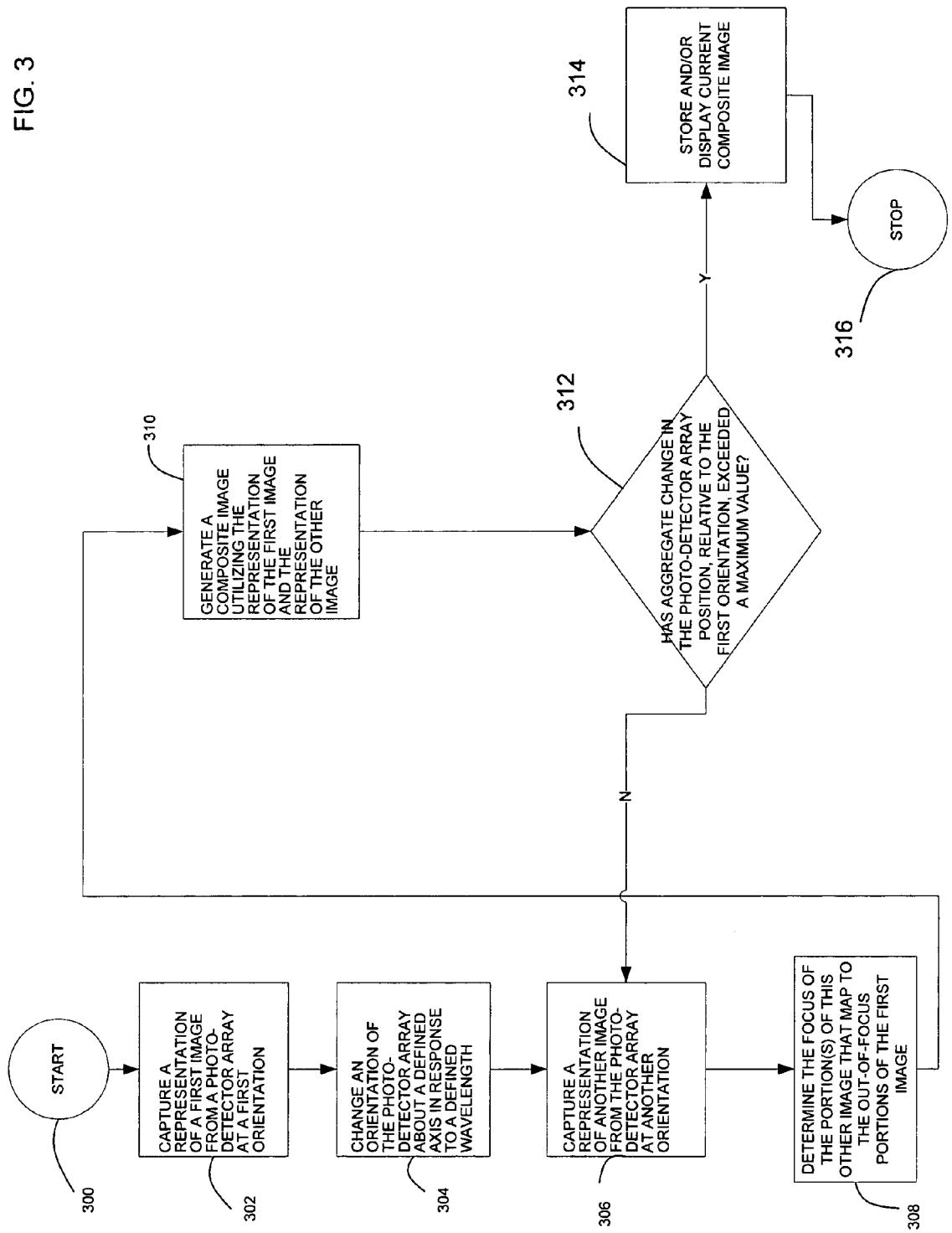
FIG. 3 depicts a high level logic flowchart of a process. Method step 300 shows the start of the process.

With reference now to FIG. 3, depicted is a high level logic flowchart of a process. Method step 300 shows the start of the process. Method step 302 depicts capturing a representation of a first image from a photo-detector array at a first orientation. In one implementation, method step 302 includes the sub-step of extracting at least one of a red, blue, and green color component of the representation of the first image. In another implementation, the sub-step of extracting at least one of a red, blue, and green color component of the representation of the first image includes the sub-step of numerically filtering the representation of the first image.

Figure 4:
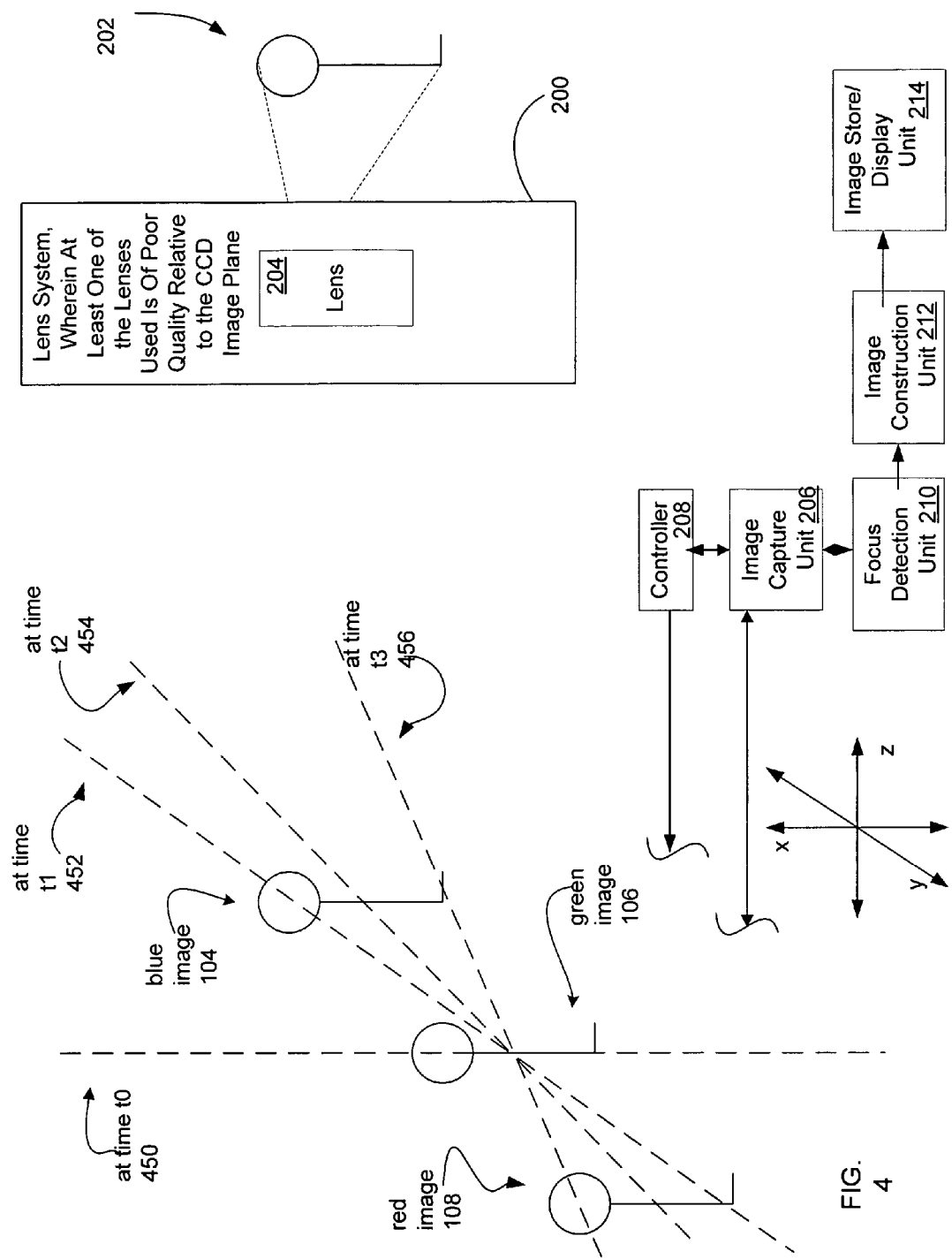
FIG. 4 depicts a side-plan view of the system of FIG. 2 wherein photo-detector array 102 is shown as having been moved in accordance with aspects of the process shown and described in relation to FIG. 3 and/or elsewhere herein.

Referring now to FIGS. 2, 4 and/or 5, one specific example of method step 302 (FIG. 3) would be controller 208 positioning photo-detector array 102 at a first orientation, and thereafter instructing image capture unit 206 to capture an image from photo-detector array 102. In one specific example of the herein-noted sub-steps of method step 302, image capture unit 206 includes logic to effect the operations of the sub-steps.

With reference again to FIG. 3, method step 304 illustrates changing an orientation of the photo-detector array about a defined axis in response to a defined wavelength. In one implementation, method step 304 includes the sub-step of tilting the photo-detector array about a defined axis of tilt. In another implementation, the sub-step of tilting the photo-detector array about a defined axis of tilt includes the sub-step of tilting a portion of the photo-detector array forward of the defined axis of tilt. In another implementation, the sub-step of tilting the photo-detector array about a defined axis of tilt includes the sub-step of tilting a portion of the photo-detector array rearward of the defined axis of tilt. In another implementation, method step 304 includes the sub-step of rotating the photo-detector array about a defined axis of rotation. In another implementation, the sub-step of rotating the photo-detector array about a defined axis of rotation includes the sub-step of rotating the photo-detector array about a defined center in a clockwise fashion. In another implementation, the sub-step of rotating the photo-detector array about a defined axis of rotation includes the sub-step of rotating the photo-detector array about a defined center in a counter-clockwise fashion.

Figure 5:
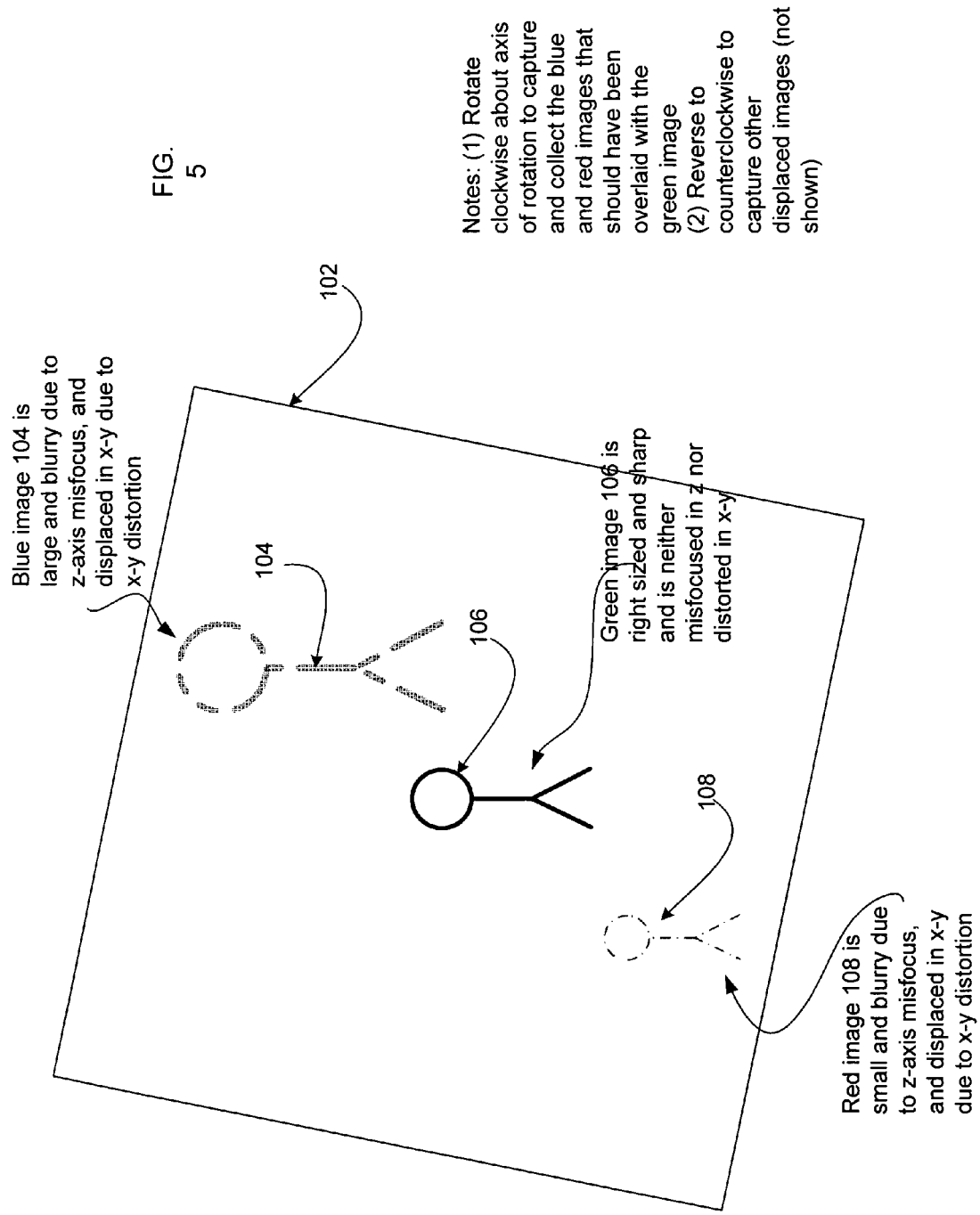
FIG. 5 illustrates a front-plan view of a portion of the system of FIG. 2 wherein photo-detector array 102 is shown as being moved in accordance with aspects of the process shown and described in relation to FIG. 3 and/or elsewhere herein.

Referring now to FIGS. 2, 4 and/or 5, specific examples of method step 304 (FIG. 3) include controller 208 positioning photo-detector array 102 at a position other than the first position in response to at least one defined wavelength of light (e.g., at least one of a red, blue, or green visible light wavelength). FIG. 4 shows and describes moving at least one portion of photo-detector array 102 forward of a first position and at least one portion of photo-detector array 102 rearward of a first position (e.g., such as by controller 208 tilting an upper half of photo-detector array 102 forward of the shown axis of tilt and tilting a lower half of photo-detector array 102 rearward of the shown axis of tilt. or vice-versa). FIG. 5 shows and describes moving photo-detector array 102 about a shown axis of rotation (e.g., such as by controller 208 rotating photo-detector array 102 either clockwise or counter-clockwise about a shown center).

With reference again to FIG. 3, method step 306 shows capturing a representation of another image from the photo-detector array at another orientation. In one implementation, method step 306 includes the sub-step of extracting at least one of a red, blue, and green color component of the representation of the other image. In another implementation, the step of extracting at least one of a red, blue, and green color component of the representation of the other image further includes the sub-step of numerically filtering the representation of the other image.

Referring now to FIGS. 2, 4 and/or 5, one specific example of method step 306 (FIG. 3) would be controller 208 instructing image capture unit 206 to capture an image from photo-detector array 102 after controller 208 has positioned photo-detector array 102 at the position other than the first position (e.g., as shown and described in relation to method step 304). In one specific example of the herein-noted sub-steps of method step 306, image capture unit 206 includes logic to effect the operations of the sub-steps.

With reference again to FIG. 3, method step 308 depicts determining a focus of at least one region of the other image relative to a focus of the at least one out-of-focus region of the first image. In one implementation, method step 308 includes the sub-step of calculating a Fourier transform of at least a part of at least one region of the first image and the other image (e.g., sharp or in-focus images produce abrupt transitions that often have significant high frequency components). In one implementation, the step of calculating a Fourier transform of at least a part of at least one region of the first image and the other image includes the sub-step of mapping at least one region of the first image with at least one region of the other image (e.g., mapping an out-of-focus region of the first image to a corresponding region of the other image).

Referring again to FIGS. 2, 4 and/or 5, one specific example of method step 308 (FIG. 3) would be focus detection unit 210 performing a Fourier transform and subsequent analysis on at least a part of an image captured by image capture unit 206 when photo-detector array 102 was at the other position specified by controller 208.

With reference again to FIG. 3, method step 310 depicts generating a composite image utilizing the representation of the first image and the representation of the other image. In one implementation, method step 310 includes the sub-steps of determining at least one focus of the representation of the first image and the representation of the other image; and assembling the composite image utilizing at least one of the representation of the first image and the representation of the other image in response to the determined at least one focus of the representation of the first image and the representation of the other image. In one implementation, determining at least one focus of the representation of the first image and the representation of the other image further includes calculating a Fourier transform of at least one of the representation of the first image and the representation of the other image (e.g., sharp or in-focus images produce abrupt transitions that often have significant high frequency components in their Fourier transforms). In another implementation, method step 310 includes the sub-step of generating the composite image utilizing the representation of the first image in at least one of a red, blue, or green color. In yet another implementation, method step 310 includes the sub-step of generating the composite image utilizing the representation of the other image in at least one of a red, blue, or green color. In yet still another implementation, method step 310 includes the sub-step of correlating the representation of the first image in a first color with the representation of the other image in another color. In yet still another implementation, method step 310 includes the sub-step of assembling the composite image from the representation of the first image in a first color and the representation of the other image in another color.

Referring again to FIGS. 2, 4 and/or 5, one specific example of method step 310 (FIG. 3) would be image construction unit 212 creating a composite image by combining in-focus portions of an image of person 202 captured at a first position with other in-focus positions of an image of person 202 captured by image capture unit 206 when photo-detector array 102 was at the other position. Specifically, with reference now again to FIG. 4, as one specific example image construction 212 creates a composite image in red-blue-green from (i) a green-filtered version of complete image 400 captured with photo-detector array 102 at position 450, (ii) a right-sized blue image constructed from blue filtered upper-half image 402 captured with photo-detector array 102 at position 452 and blue filtered lower-half image 404 captured with photo-detector array 102 at position 454 (e.g., shown and described in relation to FIG. 6), (iii) a right-sized red image constructed from red filtered upper-half image 406 captured with photo-detector array 102 at position 454 and red filtered lower-half image 408 captured with photo-detector array 102 at position 456 (e.g., shown and described in relation to FIG. 6). In some implementations, photo-detector array 102 is tilted through an angle (e.g., 65 degrees) while successive images are acquired in filtered.

Specifically again, with reference now again to FIG. 5, as another specific example of method step 310, in some applications x-y axis distortions will occur in addition to the z axis misfocusing (e.g., blue image 104, green image 106, and red image 108 might be slightly displaced from each other in the x-y plane, as well as in the z-direction. Accordingly, in some implementations, as an optional additional operation, image construction unit 212 creates a composite image in red-blue-green by applying pattern recognition techniques to features of images acquired during a x-y rotation of photo-detector array 102 about a point (e.g., a 360 degree rotation).

In other implementations of the examples of method step 310, image construction unit 212 corrects for motion between images using conventional techniques, if such correction is desired. In another implementation of the example, motion correction is not used.

With reference again to FIG. 3, method step 312 shows a determination of whether an aggregate change in a photo-detector array position, relative to the first orientation of method step 302, has exceeded a maximum value. For example, has an aggregate tilt exceeded +/−65 degrees of tilt and/or an aggregate rotation exceeded +/−180 degrees of rotation.

Referring again to FIGS. 2, 4 and/or 5, one specific example of method step 312 (FIG. 3) would be controller 208 comparing an aggregate movement in a defined direction against a pre-stored limit value (e.g., an absolute value of +/−65 degrees of rotation and/or +/−180 degrees of tilt of photo-detector array 102). In an implementation of the example illustrated in FIG. 4, controller 208 will determine whether the aggregate movement(s) of photo-detector array 102 is greater than the maximum value relative to the first position (e.g., aggregate tilt and/or aggregate rotation).

With reference again to FIG. 3, if the inquiry of method step 312 yields a determination that the aggregate change in photo-detector position has met or exceeded the maximum value, the process proceeds to method step 314. Method step 314 illustrates that the current composite image (e.g., of method step 310) is stored and/or displayed. One specific example of method step 314 would be image store/display unit 214 either storing or displaying the composite image (e.g., FIGS. 2, 4, and/or 5).

Method step 316 shows the end of the process.

Returning to method step 312, shown is that in the event that the maximum value has not been met or exceeded, the process proceeds to method step 306 and continues as described herein.

Referring now to FIG. 4, depicted is a side-plan view of the system of FIG. 2 wherein photo-detector array 102 is shown as having been moved in accordance with aspects of the process shown and described in relation to FIG. 3 and/or elsewhere herein. Photo-detector array 102 is illustrated as having been moved (tilted) to first position 450 at a time t0

(e.g., as shown and described in relation to method step 302), second position 452 at time t1, third position 454 at time t2, and fourth position 456 at time t3 (e.g., as shown and described in relation to the process loop including method step 306 and method step 312). At the various respective positions 450–456, photo-detector array 102 is shown as proximate to various portions of blue image 104, green image 106, and red image 108 (e.g., as shown and described in relation to FIGS. 1, and 2). In one implementation, such proximities, in conjunction with color filtering (numerical or otherwise), are used by image construction unit 212 to construct (i) a green-filtered version of complete image 400 captured with photo-detector array 102 at position 450, (ii) a right-sized blue image constructed from blue filtered upper-half image 402 captured with photo-detector array 102 at position 452 and blue filtered lower-half image 404 captured with photo-detector array 102 at position 454 (e.g., shown and described in relation to FIG. 6), and (iii) a right-sized red image constructed from red filtered upper-half image 406 captured with photo-detector array 102 at position 454 and red filtered upper-half image 408 captured with photo-detector array 102 at position 456 (e.g., shown and described in relation to FIG. 6). In some implementations, photo-detector array 102 is tilted through an angle (e.g., 65 degrees) while successive images are acquired and filtered. Thereafter, image construction unit 212 creates a composite image in red-blue-green from the various constructed right-sized images in blue, green, and red using numerical processing techniques (e.g., as shown and described in relation to method step 310 in conjunction with method step 314).

Referring now to FIG. 5, illustrated is a front-plan view of a portion of the system of FIG. 2 wherein photo-detector array 102 is shown as being moved in accordance with aspects of the process shown and described in relation to FIG. 3 and/or elsewhere herein. Photo-detector array 102 is illustrated as being moved (rotated) through an angle (e.g., 30, 60, 90, 180, 360 degrees, etc. such as shown and described in relation to the process loop including method step 306 and method step 312). In one implementation where x-y distortion is present such that blue image 104 and red image 108—which without such x-y distortion would overlay green image 106, but offset in z, are offset in x-y from green image 108, such rotation is employed to account for such x-y distortion. Specifically, at the various respective angles, photo-detector array 102 is shown as proximate to various portions of blue image 104, green image 106, and red image 108 of (e.g., as shown and described in relation to FIGS. 1, and 2). In one implementation where x-y distortion is present, such proximities, in conjunction with color filtering and/or other imaging techniques (numerical or otherwise), are used by image construction unit 212 to correct for such distortion in x-y. Thereafter, image construction unit 212 creates a composite image in red-blue-green from the various right-sized images in blue, green, and red using numerical processing techniques as shown and described herein (e.g., as shown and described in relation to method step 310 in conjunction with method step 314). The remaining components and control aspects of the various parts of FIG. 5 function as described elsewhere herein.

Figure 6:
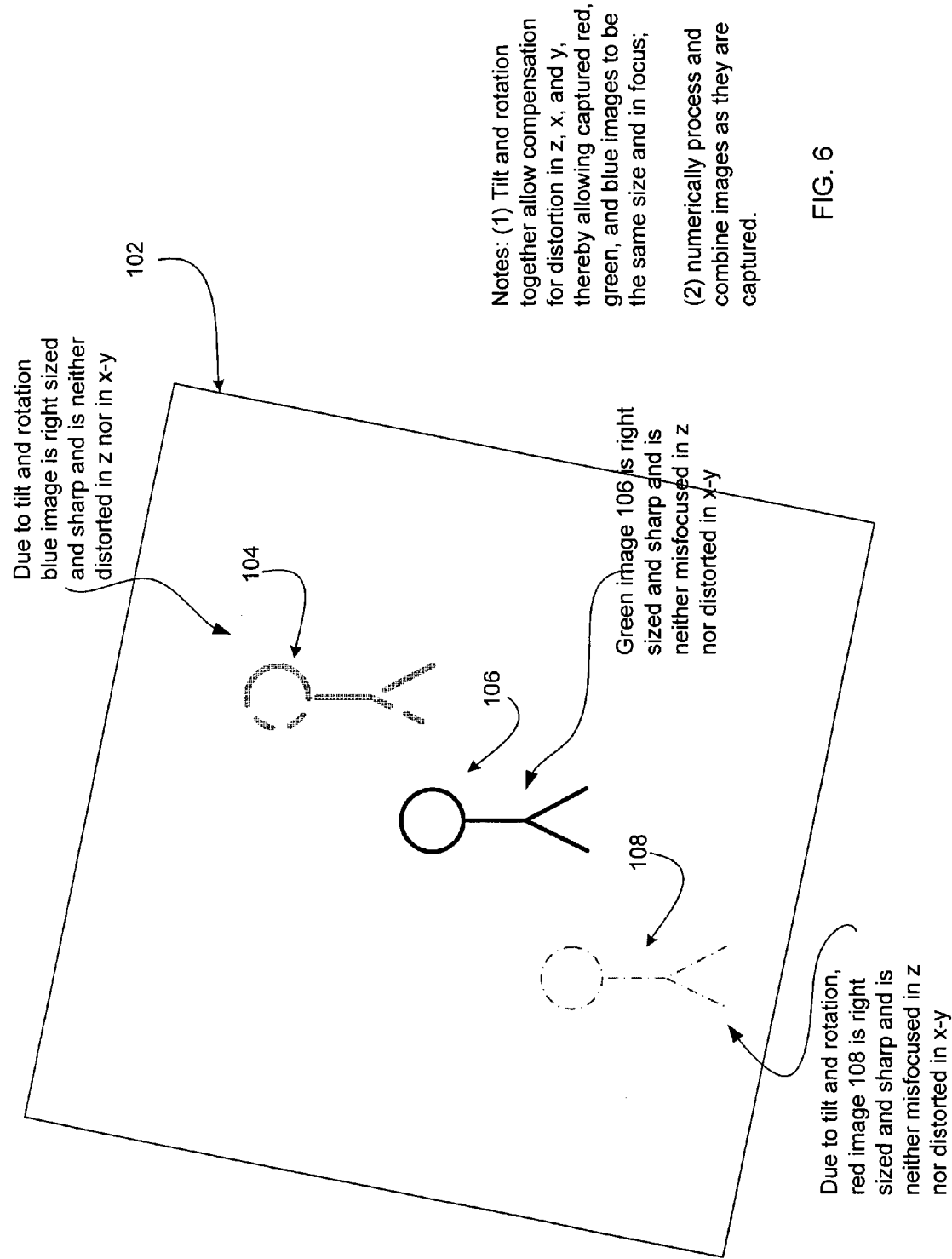
FIG. 6 shows a front plan view pictographically depicting that in some implementations of processes and devices described herein, the tilt and rotation together allow compensation for misfocusing (in a z direction) and distortion (in an x-y plane) such that images filtered in red, green, and blue.

With reference now to FIG. 6, shown is a front plan view pictographically depicting that in some implementations of processes and devices described herein, the tilt and rotation together allow compensation for misfocusing (in a z direction) and distortion (in an x-y plane) such that images are filtered in red, green, and blue. Shown is that in some implementations a net result of the herein described tilting and/or rotation and/or filtering and/or processing results in a photo-detector capturing right sized and sharp versions of blue image 104, green image 106, and red image 108. In one implementation, image construction unit 212 creates a composite image in red-blue-green from the various right-sized images in blue, green, and red using numerical processing techniques as shown and described herein (e.g., as shown and described in relation to method step 310 in conjunction with method step 314).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs), Field Programmable Gate Arrays (FPGAs), or other integrated formats. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution.

Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various embodiments described herein which can be implemented, individually and/or collectively, by various types of electro-mechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electronics systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context may dictate otherwise.

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations)

What is claimed is:

1. A method of capturing an image, comprising:
    capturing a representation of a first image from a photo-detector array at a first orientation;
    changing an orientation of the photo-detector array about a defined axis in response to a defined wavelength;
    capturing a representation of another image from the photo-detector array at another orientation; and
    generating a composite image utilizing the representation of the first image and the representation of the other image.

2. The method of claim 1, wherein said capturing a representation of a first image from a photo-detector array at a first orientation further comprises:
   extracting at least one of a red, blue, or green color component of the representation of the first image.

3. The method of claim 2, wherein said extracting at least one of a red, blue, or green color component of the representation of the first image further comprises:
   numerically filtering the representation of the first image.

4. The method of claim 1, wherein said changing an orientation of the photo-detector array about a defined axis in response to a defined wavelength further comprises:
   tilting the photo-detector array about a defined axis of tilt.

5. The method of claim 4, wherein said tilting the photo-detector array about a defined axis of tilt further comprises:
   tilting a portion of the photo-detector array forward of the defined axis of tilt.

6. The method of claim 4, wherein said tilting the photo-detector array about a defined axis of tilt further comprises:
   tilting a portion of the photo-detector array rearward of the defined axis of tilt.

7. The method of claim 1, wherein said changing an orientation of the photo-detector array about a defined axis in response to a defined wavelength further comprises:
   rotating the photo-detector array about a defined axis of rotation.

8. The method of claim 7, wherein said rotating the photo-detector array about a defined axis of rotation further comprises:
   rotating the photo-detector array about a defined center in a clockwise fashion.

9. The method of claim 7, wherein said rotating the photo-detector array about a defined axis of rotation further comprises:
   rotating the photo-detector array about a defined center in a counter-clockwise fashion.

10. The method of claim 1, wherein said capturing a representation of another image from the photo-detector array at another orientation further comprises:
    extracting at least one of a red, blue, or green color component of the representation of the other image.

11. The method of claim 10, wherein said extracting at least one of a red, blue, or green color component of the representation of the other image further comprises:
    numerically filtering the representation of the other image.

12. The method of claim 1, wherein said generating a composite image utilizing the representation of the first image and the representation of the other image further comprises:
    generating the composite image utilizing the representation of the first image in at least one of a red, blue, or green color.

13. The method of claim 1, wherein said generating a composite image utilizing the representation of the first image and the representation of the other image further comprises:
    generating the composite image utilizing the representation of the other image in at least one of a red, blue, or green color.

14. The method of claim 1, wherein said generating a composite image utilizing the representation of the first image and the representation of the other image further comprises:
    correlating the representation of the first image in a first color with the representation of the other image in another color.

15. The method of claim 1, wherein said generating a composite image utilizing the representation of the first image and the representation of the other image further comprises:
    assembling the composite image from the representation of the first image in a first color and the representation of the other image in another color.

16. The method of claim 1, wherein said generating a composite image utilizing the representation of the first image and the representation of the other image further comprises:
    determining at least one focus of the representation of the first image and the representation of the other image; and
    assembling the composite image utilizing at least one of the representation of the first image and the representation of the other image in response to the determined at least one focus of the representation of the first image and the representation of the other image.

17. The method of claim 16, wherein said determining at least one focus of the representation of the first image and the representation of the other image further comprises:
    calculating a Fourier transform of at least one of the representation of the first image or the representation of the other image.

18. A system of capturing an image, comprising:
    means for capturing a representation of a first image from a photo-detector array at a first orientation;
    means for changing an orientation of the photo-detector array about a defined axis in response to a defined wavelength;
    means for capturing a representation of another image from the photo-detector array at another orientation; and
    means for generating a composite image utilizing the representation of the first image and the representation of the other image.

19. The system of claim 18, wherein said means for capturing a representation of a first image from a photo-detector array at a first orientation further comprises:
    means for extracting at least one of a red, blue, or green color component of the representation of the first image.

20. The system of claim 19, wherein said means for extracting at least one of a red, blue, or green color component of the representation of the first image further comprises:
    means for numerically filtering the representation of the first image.

21. The system of claim 18, wherein said means for changing an orientation of the photo-detector array about a defined axis in response to a defined wavelength further comprises:
    means for tilting the photo-detector array about a defined axis of tilt.

22. The system of claim 21, wherein said means for tilting the photo-detector array about a defined axis of tilt further comprises:
    means for tilting a portion of the photo-detector array forward of the defined axis of tilt.

23. The system of claim 21, wherein said means for tilting the photo-detector array about a defined axis of tilt further comprises:
    means for tilting a portion of the photo-detector array rearward of the defined axis of tilt.

24. The system of claim 18, wherein said means for changing an orientation of the photo-detector array about a defined axis in response to a defined wavelength further comprises:
  means for rotating the photo-detector array about a defined axis of rotation.

25. The system of claim 24, wherein said means for rotating the photo-detector array about a defined axis of rotation further comprises:
  means for rotating the photo-detector array about a defined center in a clockwise fashion.

26. The system of claim 24, wherein said means for rotating the photo-detector array about a defined axis of rotation further comprises:
  means for rotating the photo-detector array about a defined center in a counter-clockwise fashion.

27. The system of claim 18, wherein said means for capturing a representation of another image from the photo-detector array at another orientation further comprises:
  means for extracting at least one of a red, blue, or green color component of the representation of the other image.

28. The system of claim 27, wherein said means for extracting at least one of a red, blue, or green color component of the representation of the other image further comprises:
  means for numerically filtering the representation of the other image.

29. The system of claim 18, wherein said means for generating a composite image utilizing the representation of the first image and the representation of the other image further comprises:
  means for generating the composite image utilizing the representation of the first image in at least one of a red, blue, or green color.

30. The system of claim 18, wherein said means for generating a composite image utilizing the representation of the first image and the representation of the other image further comprises:
  means for generating the composite image utilizing the representation of the other image in at least one of a red, blue, or green color.

31. The system of claim 18, wherein said means for generating a composite image utilizing the representation of the first image and the representation of the other image further comprises:
  means for correlating the representation of the first image in a first color with the representation of the other image in another color.

32. The system of claim 18, wherein said means for generating a composite image utilizing the representation of the first image and the representation of the other image further comprises:
  means for assembling the composite image from the representation of the first image in a first color and the representation of the other image in another color.

33. The system of claim 18, wherein said means for generating a composite image utilizing the representation of the first image and the representation of the other image further comprises:
  means for determining at least one focus of the representation of the first image and the representation of the other image; and
  means for assembling the composite image utilizing at least one of the representation of the first image or the representation of the other image in response to at least one focus of the representation of the first image and the representation of the other image.

34. The system of claim 33, wherein said means for determining at least one focus of the representation of the first image and the representation of the other image further comprises:
  means for calculating a Fourier transform of at least one of the representation of the first image or the representation of the other image.

35. A system comprising:
  a photo-detector array;
  a controller configured to change a position of said photo-detector array from a first orientation to another orientation in response to a defined wavelength;
  an image capture unit operably coupled with said controller; and
  an image construction unit operably coupled with said image capture unit, said image construction unit configured to construct utilizing the representation of the first image and the representation of the other image.

36. The system of claim 35, wherein said controller configured to change a position of said photo-detector array from a first orientation to another orientation in response to a defined wavelength further comprises:
  a transducer system having a control signal input operably coupled with said controller and a motion output operably coupled with said photo-detector array.

37. The system of claim 36, wherein said transducer system further comprises an electric motor operably coupled to tilt said photo-detector array.

38. The system of claim 36, wherein said transducer system further comprises an electric motor operably coupled to rotate said photo-detector array.

39. The system of claim 35, wherein said image construction unit operably coupled with said image capture unit, said image construction unit configured to construct utilizing the representation of the first image and the representation of the other image further comprises:
  circuitry for determining at least one focus of the representation of the first image and the representation of the other image; and
  circuitry for assembling the composite image utilizing at least one of the representation of the first image or the representation of the other image in response to at least one focus of the representation of the first image and the representation of the other image.

40. A method of capturing an image, comprising:
  capturing a representation of a first image from a photo-detector array at a first orientation;
  tilting the photo-detector array about a defined axis of tilt in response to a defined wavelength;
  capturing a representation of another image from the photo-detector array at another orientation; and
  generating a composite image utilizing the representation of the first image and the representation of the other image.

41. A system for capturing an image, comprising:
  means for capturing a representation of a first image from a photo-detector array at a first orientation;
  means for tilting the photo-detector array about a defined axis of tilt in response to a defined wavelength;
  means for capturing a representation of another image from the photo-detector array at another orientation; and
  means for generating a composite image utilizing the representation of the first image and the representation of the other image.

42. A method of capturing an image, comprising:
capturing a representation of a first image from a photo-detector array at a first orientation;
rotating the photo-detector array about a defined axis of rotation in response to a defined wavelength;
capturing a representation of another image from the photo-detector array at another orientation; and
generating a composite image utilizing the representation of the first image and the representation of the other image.

43. A system of capturing an image, comprising:
means for capturing a representation of a first image from a photo-detector array at a first orientation;
means for rotating the photo-detector array about a defined axis of rotation in response to a defined wavelength;
means for capturing a representation of another image from the photo-detector array at another orientation; and
means for generating a composite image utilizing the representation of the first image and the representation of the other image.

44. A method of capturing an image, comprising:
capturing a representation of a first image from a photo-detector array at a first orientation;
tilting the photo-detector array about a defined axis of tilt and rotating the photo-detector array about a defined axis of rotation in response to a defined wavelength;
capturing a representation of another image from the photo-detector array at another orientation; and
generating a composite image utilizing the representation of the first image and the representation of the other image such that a chromatic aberration is reduced.

45. A system of capturing an image, comprising:
means for capturing a representation of a first image from a photo-detector array at a first orientation;
means for tilting the photo-detector array about a defined axis of tilt and rotating the photo-detector array about a defined axis of rotation in response to a defined wavelength;
means for capturing a representation of another image from the photo-detector array at another orientation; and
means for generating a composite image utilizing the representation of the first image and the representation of the other image such that a chromatic aberration is reduced.

* * * * *